United States Patent [19]

Hori

[11] Patent Number: 4,678,979
[45] Date of Patent: Jul. 7, 1987

[54] APPARATUS FOR CONTROLLING THE CARRIAGE OF A PRINTER
[75] Inventor: Masaaki Hori, Nagoya, Japan
[73] Assignee: Brother Kogyo Kabushiki Kaisha, Nagoya, Japan
[21] Appl. No.: 881,613
[22] Filed: Jul. 3, 1986
[30] Foreign Application Priority Data
Jul. 4, 1985 [JP] Japan ................................ 60-147372
[51] Int. Cl.$^4$ ............................................. H02P 8/00
[52] U.S. Cl. .................................... 318/696; 318/685
[58] Field of Search ................. 318/696, 685; 400/320
[56] References Cited
U.S. PATENT DOCUMENTS
3,941,230 3/1976 Bellino et al. ........................ 400/320

Primary Examiner—William M. Shoop, Jr.
Assistant Examiner—Saul M. Bergmann
Attorney, Agent, or Firm—Barnes & Thornburg

[57] ABSTRACT

An apparatus for controlling the carriage of a printer equipped with a stepping motor for reciprocating the carriage with a printing head comprising a power source circuit, a drive circuit for driving the stepping motor and a controller, in combination with a voltage detector for detecting voltage supplied from the power source circuit and a delay controller for delaying the driving time of the stepping motor at each end of the reciprocating motion of the carriage according to the voltage detected by the detector in order to prevent the stepping motor from excessive temperature rise.

3 Claims, 4 Drawing Figures

APPARATUS FOR CONTROLLING THE CARRIAGE OF A PRINTER

BACKGROUND OF THE INVENTION

The present invention relates to an apparatus for controlling a stepping motor in reciprocating the carriage of a printer.

Hitherto, a stepping motor is used for reciprocating motion of the carriage of a printer. In view of stable function of the stepping motor and long span of life time thereof, it is essential to prevent the motor from overheating up to excessive temperature. Hence, it has been conventionally adopted that a temperature sensor is fitted to the motor or therearound to detect temperature of the motor directly, and that the motor is cooled by delaying drive start time at each end of the reciprocating motion of the carriage when starting printing in order to keep the motor below a specified temperature.

To perform temperature compensation of the stepping motor in the manner descrived above, however, it is necessary for the motor to be equipped with a temperature sensor, an amplifier for output signal from the sensor, a processing circuit for detected temperature signal, etc.

SUMMARY OF THE INVENTION

An object of the present invention is, therefore, to provide a novel and simple apparatus for controlling the carriage of a printer in which temperature compensation function is performed by improvement of a drive system for the stepping motor without providing any temperature sensor and processing circuit for temperature detected thereby.

In order to accomplish the foregoing object, there is provided according to the present invention an apparatus for controlling the carriage of a printer disposed on the printer which reciprocates the carriage mounting a printing head thereon by means of a stepping motor, comprising a power source circuit, a drive circuit for driving the stepping motor with electric power supplied from the power source circuit, and a controller for controlling said drive circuit, wherein said controller is provided with voltage detecting means for detecting the voltage supplied from said power source circuit, and delay controlling means for delaying drive of said stepping motor at each end of the reciprocating movement of said carriage according to the magnitude of detected voltage depending on output signal supplied from said voltage detecting means.

For example, said power source circuit for the drive circuit is a simple power source generating direct current in which alternating current is rectified through a bridge circuit and smoothed by a condenser, and it is not always necessary for the power source circuit to have a voltage stabilizing circuit.

Generally, temperature rise in the stepping motor driving the carriage of the printer is depending on such elements as driving voltage, exciting speed, load, etc. As exciting speed and load are constant and given, the temperature rise of the stepping motor depends on driving voltage.

Therefore, it is proposed according to the present invention that temperature of the stepping motor is indirectly detected by measuring voltage supplied to the stepping motor which fluctuates according to the voltage fluctuation of the AC power source. Accordingly, the motor is prevented from overheating up to excessive temperature by providing voltage detecting means for detection of the stepping motor driving voltage and delay control means for delaying actuation of the stepping motor on starting printing characters according to the voltage detected by the voltage detecting means.

Thus, when output voltage of the power source circuit is detected by the voltage detecting means, the delay control means control the stepping motor so as to delay the starting time of printing at each end of the reciprocating movement of the carriage according to the magnitude of output voltage depending on the output voltage signal from the voltage detecting means. As a result, the stepping motor is cooled and the temperature rise of the motor is kept in a certain range.

As has been described above, according to the present invention, it is not necessary at all to provide a motor with a temperature sensor and a processing circuit for detected signals. Notwithstanding, the stepping motor is effectively prevented from excessive temperature rise due to the fluctuation of the driving voltage by quite simple means even when any stabilizing power source is not used, and a quite stable service as well as high durability of the motor is insured thereby.

Other objects and features of the present invention will become apparent in the course of the following description together with the accompanying drawings.

BRIEF DESCRIPTION OF THE DRAWINGS

In the drawings forming a part of the present application and in which like reference numerals and characters denote like parts throughout the same.

DESCRIPTION OF THE PREFERRED EMBODIMENT

Described hereinafter is a preferred embodiment according to the present invention.

Figure 1:
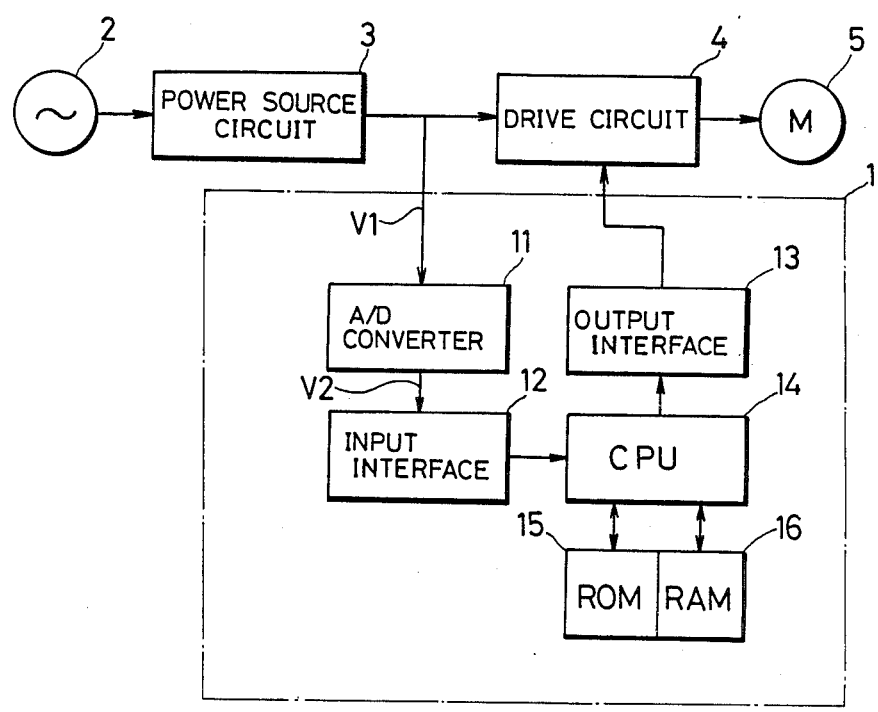
FIG. 1 is a block diagram showing an apparatus for controlling the carriage of a printer in its entirety as a preferred embodiment according to the present invention.

Referring to FIG. 1 showing an apparatus for controlling the carriage of a printer in its entirety, power from an alternating current source 2 is supplied to a power source circuit 3 comprising a bridge rectifying circuit for full wave rectification and a condenser for smoothing voltage rectified by the circuit, which means that the power source circuit 3 is not provided with a stabilizing circuit.

An output voltage V1 from the power source circuit 3 is inputted to a controller 1 comprising a one-chip microcomputer. This microcomputer substantially comprises a A/D converter 11 for receiving and converting the driving voltage V1 supplied to a drive circuit 4, an input interface 12 for inputting output signal from the converter 11, a CPU 14 for processing signals, a ROM 15 in which processing program and a memory map described hereinafter are stored, a RAM 16 for storing input data etc., and an output interface 13 for outputting control signal for driving the drive circuit 4.

The drive circuit 4 is a pulse generator by which the direct current V1 supplied from the power source circuit 3 is converted into pulse by pulse modulation according to control signal outputted from the controller 1, and the pulse generator generates pulse voltage for driving a stepping motor 5 which reciprocates the carriage mounting a printing head thereon.

Figure 2:
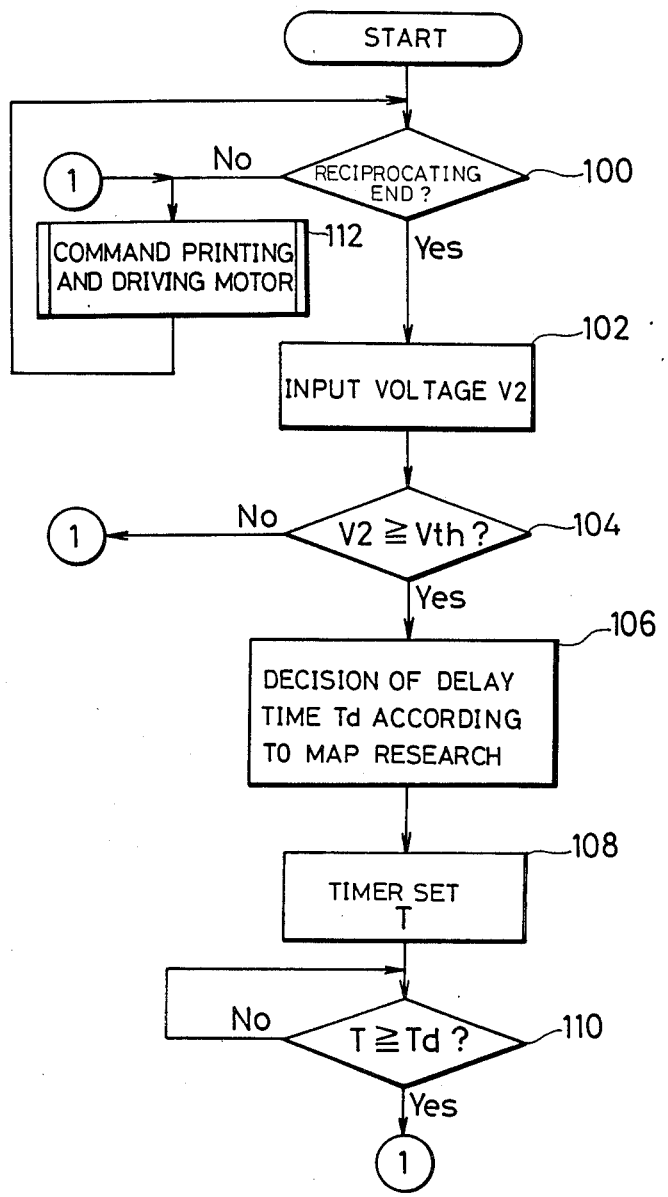
FIG. 2 is a flow chart showing a processing routine performed by CPU of the apparatus.

Referring now to FIG. 2 showing a flow chart of a processing routine in the CPU 14, operation of the carriage control apparatus is described hereunder.

When control operation is started, the CPU 14 judges in step 100 whether the carriage has reached the end of the reciprocating movement or not. When it is judged that the carriage has not reached the end, the routine is advanced to step 112 where the stepping motor 5 is driven and, at the same time, printing command signal is outputted to the drive circuit 4 for driving a printing head to carry out printing.

On the other hand, when, it is judged that the carriage has reached the end of the reciprocating motion, the routine is advanced from step 100 to step 102 where voltage is detected by inputting a signal V2 generated from the output voltage V1 in A/D converter 11 by way of the interface 12. Then, advancing to step 104, the driving voltage V2 is compared with a threshold voltage Vth, the routine is advanced to step 106. In step 106 a memory map showing a relation between the driving voltage V2 and a required delay time Td is searched to obtain a delay time Td corresponding to the driving voltage V2.

Figure 3:
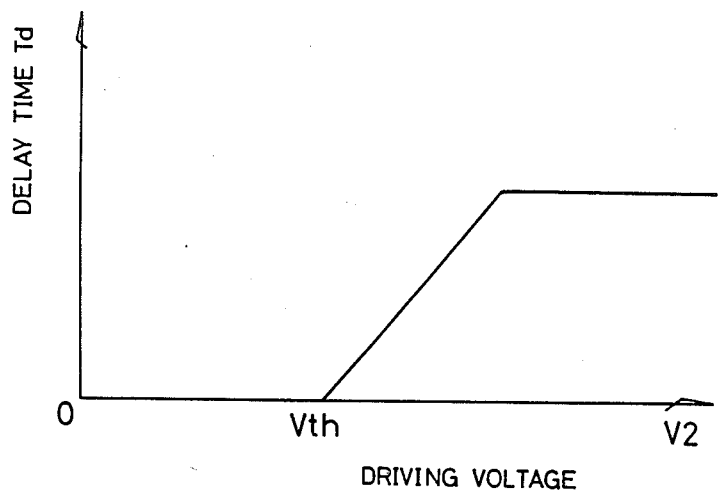
FIG. 3 shows a characteristic of a relation between delay time in motor drive and driving voltage of the apparatus.

The memory map defining the relation between the driving voltage V2 and the delay time Td stored in the memory in ROM 15 has a characteristic shown in FIG. 3, in which it is established that the higher the driving voltage V2 than the threshold voltage Vth is, the more the delay time Td is, within a specified range. In other words, since the temperature is raised higher in proportion to increase of the driving voltage V2, it is necessary for the motor 5 to be cooled and prevented from temperature rise by delaying actuation of the motor 5 for next printing. Then, in step 108, a timer T is set for waiting until the delay time Td obtained in step 110 has lapsed. After passing the delay time Td, the routine is advanced from step 110 to a step 112 where the drive of the motor 5 and printing are started.

In this manner, when the driving voltage V2 is higher than the threshold voltave Vth, the starting time of the stepping motor 5 is delayed at each end of the reciprocating motion of the carriage, thereby the motor being cooled and prevented from temperature rise.

In the case of the emdodiment described so far, the relation between the driving voltage V2 and the delay time Td is established irrespective of the mode of printing speed, but it is also preferable to establish a relation between them according to each printing speed mode, i.e., high speed, medium speed and low speed. Since current intensity in the stepping motor 5 is larger and the temperature thereof is raised higher in the case of low speed printing mode, the motor is more effectively prevented from temperature rise by taking the delay time longer even when the driving voltage is low.

Figure 4:
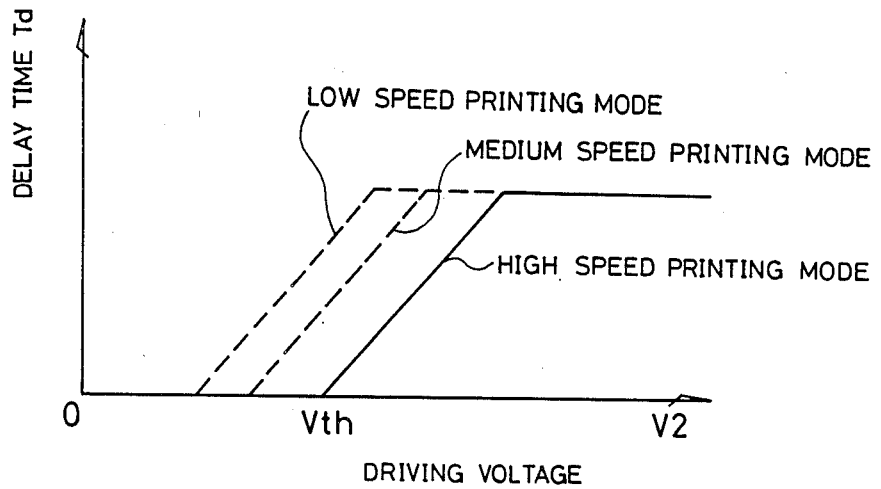
FIG. 4 shows a characteristic of a relation between delay time and driving voltage of an apparatus of another embodiment.

In above case, the relation in FIG. 4 is stored in the memory map in ROM 15 instead of the relation in FIG. 3.

It should be understood by those skilled in the art that the foregoing description is a preferred embodiment of the disclosed device and that various changes and modification may be made in the invention without departing from the spirit and scope thereof.

What is claimed is:

1. An apparatus for controlling the carriage of a printer with a stepping motor, for reciprocating the carriage having a printing head mounted thereon, comprising a power source circuit, a drive circuit for driving said stepping motor with electric power supplied from said power source circuit, and a controller which controls said drive circuit;

wherein said controller is provided with voltage detecting means for detecting the magnitude of the voltage supplied from said power source circuit, and delay control means for delaying the initiating of the drive of said stepping motor at each end of the reciprocating motion of said carriage according to said magnitude of detected voltage supplied from said voltage detecting means.

2. The apparatus for controlling the carriage of a printer of claim 1, wherein said controller further comprises an A/D converter for receiving and converting the driving voltage supplied to said drive circuit and for outputting the converted digital signals to said voltage detecting means.

3. The apparatus for controlling the carriage of a printer of claim 2, wherein said controller further comprises a memory for containing a memory map which defines a relation between said A/D converted voltage signals and a delay time of said delay control means.

* * * * *